United States Patent

Welker et al.

[11] Patent Number: 6,153,005
[45] Date of Patent: Nov. 28, 2000

[54] FOAMED CONCRETE COMPOSITION AND PROCESS

[75] Inventors: Charles D. Welker, 5940 Royal Palms, Plano, Tex. 75093; Martha A. Welker, Plano, Tex.; Mark F. Welker, Hudson, Ohio; Mark A. Justman, Hoffman Estates, Ill.; Randy S. Hendricksen, Arlington, Tex.

[73] Assignee: Charles D. Welker, Plano, Tex.

[21] Appl. No.: 09/293,613

[22] Filed: Apr. 16, 1999

[51] Int. Cl.⁷ .......................... C04B 38/10; C04B 24/12; C04B 24/15
[52] U.S. Cl. .................. 106/677; 106/678; 106/708; 106/714; 106/724; 106/725; 106/727; 106/790; 106/795; 106/802; 106/808; 106/809
[58] Field of Search ...................... 106/677, 678, 106/708, 714, 724, 725, 727, 802, 808, 809, 823, 790, 795

[56] References Cited

U.S. PATENT DOCUMENTS

| | | | |
|---|---|---|---|
| 3,963,507 | 6/1976 | Kuramoto et al. | 521/83 |
| 4,019,919 | 4/1977 | DeSalvo | 524/8 |
| 4,373,955 | 2/1983 | Bouchard et al. | 106/646 |
| 5,595,595 | 1/1997 | Glenn | 106/672 |

FOREIGN PATENT DOCUMENTS

| | | | |
|---|---|---|---|
| 2806327 | 8/1979 | Germany | 106/677 |
| 58-135836 | 8/1983 | Japan . | |
| 7-17752 | 1/1995 | Japan . | |

*Primary Examiner*—Anthony Green

[57] ABSTRACT

The present invention describes fluorochemical foam stabilizers used in combination with surfactants to yield foams that are exceptionally stable in cementitious media. The stabilized foams that incorporate these fluorochemical agents are useful as novel ultra-lightweight foam aggregates in concrete compositions of tailorable density, strength, and other properties. Methods of making concrete compositions that include such foam aggregates are also described.

24 Claims, No Drawings

FOAMED CONCRETE COMPOSITION AND PROCESS

FIELD OF THE INVENTION

The present invention relates to concrete compositions that include foams stabilized with fluorochemical agents as a component. Upon dilution with water and subsequent aeration, suitable surfactant containing formulations or compositions that include the fluorochemical foam stabilizers described herein produce foams that demonstrate exceptional stability and strength in cementitious media. The introduction of such stabilized foams, hereinafter referred to as "foam aggregates", as new and unique ultra-lightweight components in concrete compositions yields high performance materials of tailorable density, strength, and other properties. Concrete compositions incorporating these novel foam aggregates provide a wide variety of cost effective materials with tailored physical properties that are alternatives to common structural and non-structural materials such as wood, steel and normal-weight concrete. Methods of making such concrete compositions are also disclosed.

BACKGROUND OF THE INVENTION

Concrete is a composite material that is composed of water, cement, and aggregate. Common aggregates include sand, gravel, or crushed stone. Concrete is a well-known structural component with typical compressive strengths of approximately 2500 psi. More detailed discussions regarding concrete and its properties can be found in Concrete, by S. Mindess and J. F. Young (Prentice Hall, Inc, Englewood Cliffs, N.J. 1981), in Design and Control of Concrete Mixtures, $13^{th}$ Ed., by H. Kosmatka and W. C. Panarese (Portland Cement Association, Skokie, Ill., 1988), and in the ACI Manual of Concrete Practice (American Concrete Institute, 1987). There are numerous applications where a lower density concrete may be suitable, useful, or desirable, especially when combined with other attributes such as better processing, higher strength to weight ratio, improved insulation properties, and or enhanced acoustic properties.

Useful concrete compositions of reduced density are produced by the introduction of solid aggregates of lower density, by incorporating significant amounts of air or other gas, or by a combination of these methods such as including expanded polystyrene or other polymer foam. Structural lightweight concrete compositions (85–115 lb/ft$^3$) are most commonly prepared using lightweight aggregates (35–70 lb/ft$^3$, as compared to 75–110 lb/ft$^3$ for normal weight aggregates) such as kiln expanded clays, shales, and slates; sintering grade expanded shales and slates; pelletized or extruded fly-ash; and expanded slags. The use of these lightweight aggregates is limited by their lower limit of density, their availability, phase separation or non-uniformity upon curing, as well the high cost associated with material, fuel, labor, processing, and transportation.

Other types of lightweight aggregates are available. For example, Desalvo, U.S. Pat. No. 4,019,919, used irregular roughened polyethylene particles for some or all of the aggregate, but particles of this nature tend to separate from the mix as well as rise to the surface, leading to non-uniform compositions. Applications of this technology are also limited by polyethylene's density and cost.

Glenn, U.S. Pat. No. 5,595,595, used aquagels as lightweight aggregates. The use of aqueous gels of polysaccharides requires considerable processing that may include heating, cooling, precipitation into immiscible non-aqueous liquids, chemical treatment, filtration, centrifuging, extruding, vibration molding, or forming. Refrigerated storage is required if the aquagels are not used immediately.

Given the inherently low density of gasses and their relative abundance or ease of generation, their incorporation can have significant advantages for lowering the density of concrete. There are two fundamentally different approaches to incorporating air or other low density gasses. One approach generates gas in situ by chemical reaction and the other approach generates small pockets of air or gas either by whipping the concrete or by including preformed bubbles or foam into the wet mix before curing.

The in situ generation of gas typically involves the production of hydrogen gas from the base catalyzed reaction of a finely divided reactive metal species such as aluminum. AEROCRETE®, from Aircrete Corp., and DUROX®, from U.S. Durox Corp. are examples. This approach requires uniform premixing, the fine control of many processing parameters, and significant capital investment for dedicated special equipment. Other drawbacks to this approach may include the use of autoclaves to cure the concrete under pressurized hydrothermal conditions, the need for molds or other types of undesirable processing steps, and limited vertical uniformity (usually less than two feet). Large shapes or complicated designs are usually precluded from this approach.

Although whipping air into concrete is capable of entrapping bubbles and reducing density, this method is not always practical. Foams are often generated separately using surfactants and other foaming agents in combination with water and air before being introduced to a premixed paste of cement, water, and aggregate. Cellulose based foaming agents are described by Kuramoto et al. in U.S. Pat. No. 3,963,507. A commercially available cellulose based foaming concentrate, "CELLUCON", is also available from Romaroda Chemicals Pty., Ltd., Victoria Australia. Bouchard et al. in U.S. Pat. No. 4,373,955 described a hydrolyzed protein based foaming agent and a hydrolyzed protein based foaming concentrate, MEARL™, is available from The Mearl Corporation, Roselle Park, N.J.

Previously, economical and convenient surfactant based foams for use in concrete have not maintained their structures for 90 minute mixing cycles as well as prolonged cure cycles. Despite many advantages, concrete compositions including foam aggregates have often been limited to insulating, non-structural, or non-load-bearing bearing applications, since most commercially available foaming agents are not sufficiently stable in cementitious media and the results are often not consistent. In the previous art, the size and distribution of foam cells have been difficult to control and the cells have had a limited period of usefulness or lifetime. The foam cells have tended to agglomerate, coalesce, and recombine to give larger cells and a wide range of sizes. Long mixing times, such as required for transportation from a concrete production facility to a construction site, have been precluded due to bubbles collapsing and air escaping from the mix. Even when additives have been used to stabilize these foams, such as described by Johansson et al. in U.S. Pat. No. 5,160,540, it is not always practical to add the foam to the cementitious mix at the concrete station since the foam's stability and useful lifetime may prevent transportation. Nakano et al. in U.S. Pat. No. 4,683,003 alter the cure speed to match the foam's useful lifetime using accelerators, retarders, and autoclaving. This method is not trivial and it is impractical for many targeted applications.

A colloidal solution, or sol-gel, stabilizer is described by Gelbman et al. in U.S. Pat. No. 4,900,359. This method may extend the useful lifetime of the foamed concrete, but requires a minimum of 5 percent sol-gel in the foam. The cost of raw materials and the difficult preparation and mixing are prohibitive for many applications using this approach.

OBJECTS OF THE INVENTION

It is therefore an object of the present invention to provide easily accessible and economically manufactured concrete compositions of tailorable and predictable densities, strengths, and other characteristics that can be used to produce structural and non-structural products having excellent and highly desirable performance attributes such as strength, insulation, fireproofing, and or durability.

It is a further object of this invention to provide concrete compositions of tailorable and predictable densities, strengths, and other properties that do not have accelerated, unusual, erratic, undesirable, or otherwise unacceptable setting or curing characteristics associated with many of the tailorable concrete compositions of the prior art.

It is yet another object of this invention to provide concrete compositions of tailorable and predictable densities, strengths, and other properties that have and maintain a discreet, uniform, and symmetric structure without loss of cell integrity and that do not demonstrate undesirable shrinkage or other diminished properties of the product due to agglomeration, coalescence, recombination, or collapse of bubbles prior to setting or hardening of the concrete.

An even further object of this invention is to easily provide a uniform, stable, lightweight aggregate material from the cured cellular concrete by heretofore known crushing methods for further use in a wide variety of concrete compositions such as structural and non-structural concretes, steel fireproofing, insulating materials, and lightweight concrete blocks.

SUMMARY OF THE INVENTION

The present invention relates to fluorochemical foam stabilizers used in combination with surfactants to yield aqueous based foams that are exceptionally stable in cementitious media. The stabilized foams that incorporate these fluorochemical agents are useful as novel ultra-lightweight foam aggregates in concrete compositions of tailorable density, strength, and other properties. Methods of making concrete compositions that include such foam aggregates are also described.

DETAILED DESCRIPTION

The present invention relates to fluorochemical agents that are useful in surfactant containing formulations or compositions to improve the stability and resilience of foams containing such agents when in contact with cementitious compositions. The bubbles of these derived foam aggregates retain their discreet structures throughout various processing steps such as transportation, pumping, molding, and curing. The high stability and resilience of the resultant foams enable their use as novel stable ultra-lightweight aggregates in combinations with other concrete components including but not limited to water, cement, hydraulic hydrated lime, ground granulated iron blast furnace slags, sand, silica, stone, other, natural and byproduct pozzolanic materials, as well as chemical admixtures such as water-reducers and superplasticizers. The fluorochemical foam stabilizers enable exceptionally stable foam aggregates that are useful components in economical, lightweight to near normal-weight, high performance concrete compositions having a wide variety of applications. These materials constitute a significant advancement in structural and non-structural materials when compared to conventional normal-weight concrete compositions (130–160 lb/ft$^3$), conventional lightweight concrete compositions (15–130 lb/ft$^3$), steel, or wood.

When compared to conventional normal-weight concrete, the freshly mixed (plastic) concrete compositions incorporating these novel foam aggregates in wet cementitious compositions can demonstrate several advantages such as improved plasticity, ductility, workability, flowability, resistance to freeze-thaw, and ease of transport; reduced water demand, bleeding, and segregation; and easily tailored properties such as density, viscosity, and thixotropy.

When compared to conventional normal-weight concrete, the hardened concretes derived from compositions incorporating these novel foam aggregates can demonstrate significant improvements in workability, ease of machining, water-tightness, and deicer scaling; increased resistance to sulfate, alkali-silica reactivity, and freeze-thaw; and easily tailored properties such as density, compressive strength relative to density, thermal resistance, and acoustic characteristics.

The fluorochemical foam stabilizers of the present invention are generally identified and characterized as fluorinated surfactants. The fluorochemical foam stabilizers are water soluble and must be stable to the various chemical species contained in concrete, such as $Ca^{+2}$ cations. The fluorochemical foam stabilizers of the invention are characterized by chemical moieties represented by the general formula, $F-E_a-(S)_b-[M_1]_x-[M_2]_y-H$ (Formula I), and mixtures thereof. It is understood that Formula I is not intended to depict the actual sequence of the oligomer or macromer units since the units can be randomly distributed throughout. It is also assumed that the monomers from which $M_1$ and $M_2$ units are derived are known per se.

$R_f$ is a straight chain, branched chain, or cyclic perfluoroalkyl of 1–20 carbon atoms, or said perfluoroalkyl substituted by perfluoroalkoxy of 2–20 carbon atoms, or an oligomer or polymer of greater than 10 carbon atoms such as oligo(hexafluoropropylene oxide) and it is understood that $R_f$ often represents a mixture of perfluoroalkyl moieties.

E is a direct bond or independently a branched chain, straight chain, or cyclic alkylene connecting group of 2 to 20 carbon atoms, or said connecting group interrupted by one or more groups selected from, but not limited to, —NR—, —O—, —S—, —SO$_2$—, —COO—, —OOC—, —CONR—, —NRCO—, —SO$_2$NR—, —NRSO$_2$—, —SiR$_2$—; or is terminated at the $R_f$ end with —CONR— or —SO$_2$NR— where $R_f$ is attached to carbon or sulfur atom. R is independently hydrogen, alkyl of 1–10 carbon atoms, or hydroxyalkyl of 2 to 10 carbon atoms; and a and b are independently 0 or 1.

$M_1$ and $M_2$ are water soluble groups or mixtures thereof. Examples may include but are not limited to —W—(—C$_m$H$_{2m}$NH)$_p$ or —W—(—C$_m$H$_{2m}$N—)$_q$ where W represents —CO— or —SO$_2$—, m is 2–20, p and q are 0 to 500, and p+q are equal to or larger than 1. Preferably, $M_1$ represents a non-ionic hydrophilic monomer unit and $M_2$ represents an anionic hydrophilic monomer unit, and x and y represent the number of monomer units present in the co-oligomers and are both greater than 0; the sum of x and y being between 5 and 200, and y/(x+y) being between 0.01 and 0.98.

Many non-ionic hydrophilic monomers of the type $M_1$ are known per se and many are commercially available. Especially valuable non-ionic hydrophilic monomers of the type $M_1$ are acrylamide, methacrylamide, diacetone acrylamide, and 2-hydroxyethyl methacrylate. Other examples of such monomers include derivatives of acrylic, methacrylic, maleic, fumaric, and itaconic acids, such as hydroxyalkyl esters of acrylic acids; amides such as N-vinyl-pyrrolidone, N-(hydroxyalkyl)-acrylamides, or N-(hydroxyalkyl)-methacrylamides; and vinyl esters with 1–20 carbons in the ester group such as vinyl acetate, butyrate, laurate, or stearate. The above listed non-ionic hydrophilic monomers of the type $M_1$ can be used alone or in combination with each other as well as in combination with suitable anionic hydrophilic monomers of the type $M_2$. Some non-ionic hydrophilic monomers of the type $M_1$ may require a co-monomer for polymerization, such as di(hydroxyalkyl) maleates with ethoxylated hydroxyalkyl maleates.

Many anionic hydrophilic monomers of the type $M_2$ which do co-oligomerize with non-ionic hydrophilic monomers of the type $M_1$ are known per se and many are commercially available. Especially valuable anionic hydrophilic monomers of the type $M_2$ are acrylic and methacrylic acids and salts thereof. Other examples of such monomers include maleic, fumaric, and itaconic acids and salts thereof; acrylamidopropane sulfonic acid and salts thereof; and mono-olefinic sulfonic and phosphonic acids and salts thereof.

The preferred foaming concentrates of the present invention are comprised of aqueous solutions of fatty alcohols preferably selected from the group consisting of straight and branched chain fatty alcohols of 8 to 16 carbon atoms and mixtures thereof, a polysaccharide gum preferably selected from the group consisting of Rhamsan gums, Xanthan gums, Guar gums and Locust Bean gums, and a non-fluorinated anionic surfactant preferably selected from the group consisting of C-8 to C-18 anionic surfactants and most preferably, C-10 to C-18 alpha olefin sulfonates, as well as mixtures of such surfactants. The concentrate may also contain a solvent, preferably selected from the group consisting of glycol ethers and C-2 to C-8 aliphatic diols.

Table 1 below sets forth the foaming concentrate compositions of the present invention. In Table 1, column 1 specifies the useful ranges for each component, column 2 specifies preferred ranges for each of the components and column 3 describes the highly preferred ranges for each of the components. In Table 1, all compositions are in parts by weight. The fluorochemical surfactant is normally supplied as a solution in an alcohol such as tert-butyl alcohol.

TABLE 1

|  | 1 | 2 | 3 |
|---|---|---|---|
| Solvent | 0–50% | 0–20% | 1–10% |
| Fatty Alcohol | 0.1–10% | 0.1–1.0% | 0.2–1.0% |
| Polysaccharide Gum | 0.1–10% | 0.1–5.0% | 0.5–4.0% |
| Anionic Surfactant | 0.1–50% | 0.1–20% | 0.5–8.0% |
| Fluorochemical | 0.1–15% | 0.1–5.0% | 0.5–3.0% |
| Water | Balance | Balance | Balance |

Specifically preferred as the solvent, if used, is propylene glycol t-butyl ether. The preferred fatty alcohol comprises a mixture of equal parts n-dodecanol, n-tetra decanol and n-hexadecanol. Preferred as the anionic surfactant are mixtures of sodium alkenyl sulfonate, sodium tetradecene sulfonate, and sodium hexadecene sulfonate in a ratio of about 4:1:1.

Other ingredients can be employed in the composition of the surfactant formulation to effect specific environmental or shelf-life concerns. Examples of such ingredients are freezing point depressants, such as ethylene glycol, and preservatives, such as that available under the trade name DOWICIDE (Dow).

Other embodiments of the present invention relate to additional foams or foaming concentrates intended for use as components in concrete wherein said foam formulations or compositions contain fluorinated foam stabilizers. For example, fluorochemical agents that are foam stabilizers in concrete can be added to other known foaming surfactant concentrates such as the cellulose based "CELLUCON" (Romaroda Chemicals Pty.) or the hydrolyzed protein based MEARL™ (The Mearl Corporation).

While the stabilized foams of this invention are useful in producing concrete compositions that also contain common aggregates such as sand, gravel, or crushed stone, they also have utility in their own right as "foam aggregates" to provide unique ultra-lightweight aggregate when no sand or other common aggregate is used. The stabilized foam can be the only aggregate for very low density concrete. In such cases, the resultant material is most typically useful as a lightweight insulation material; it is not typically useful as a structural material for most applications since it possesses minimal structural strength. Consequently, Table 2 below that describes useful (column 1), preferred (column 2) and highly preferred (column 3) ranges of composition for the foamed concrete materials of the present invention, does not require the inclusion of sand or course aggregate. In Table 2, all compositions except for the optional water reducing chemical admixtures and set accelerating admixtures are expressed in percent by volume. The amounts of water reducing chemical admixtures and set accelerating admixtures are expressed in ounces per 100 pounds of cementitious and pozzolanic material added.

TABLE 2

|  | 1 | 2 | 3 |
|---|---|---|---|
| Portland Cement | 1–50% | 6–50% | 10–25% |
| Washed Sand | 0–75% | 0–60% | 0–40% |
| Coarse Aggregate | 0–60% | 0–50% | 0–40% |
| Water | 4–50% | 5–50% | 10–25% |
| Cementitious and Pozzolanic Material | 0–50% | 0–20% | 0–5.0% |
| Air as Provided as Foam | 1–90% | 1–85% | 1–75% |
| Water Reducers | 0–20 oz | 0–6.0 oz | 0–4.5 oz |
| Accelerators | 0–20 oz | 0–12 oz | 0–8.0 oz |

The cementitious and pozzolanic materials of this composition are those well known in the concrete art, namely, such materials as fly ash (both types C and F), ground blast furnace slag, diatomaceous earth, hydrated lime, natural cement, etc. Water reducing chemicals are also well known in the art. Non-limiting examples of such materials are, lignosulfonates, sulfonated melamine formaldehyde and naphthalene formaldehyde condensates, hydroxylated carboxylic acids, and carbohydrates. Set accelerating mixtures include such materials as calcium chloride, triethanol amine, sodium thiocyanate, calcium formate, calcium nitrate, and calcium nitrite.

In the compositions described in Table 2, the concentrate of Table 1 comprises from about 1 to about 10 percent by weight of the "air provided as foam". Preferably, this concentration ranges from 1 to 5 percent. More preferably, this concentration ranges from about 1.5 to about 3 percent. Water and air comprise the balance of the "air provided as foam".

The fluorinated foam stabilizers of the present invention are also useful as stabilizers for surfactant based foaming compositions of a more general type, namely, as stabilizers for any surfactant based foam material wherein it is desired to produce a bubble having exceptional stability in cementitious media. For example, hydrolyzed protein or cellulose based foaming compositions, such as the foams derived from the Mearl and Cellucon products discussed above in the prior art, will similarly benefit from the addition of the fluorochemical foam stabilizers of the present invention, as will other similar surfactant based foaming materials. The addition of fluorochemical foam stabilizers to all such materials so as to enhance foam stability in cementitious media is contemplated as within the scope of the instant invention.

Foam production can be performed by drawing water and concentrate from separate sources, in the ratios described above, and injecting them using high pressure air or other suitable gas, preferably at about 125 psi, into a chamber where the mixture is subjected to shearing forces and thereby producing stabilized bubbles or foam. Any number of foam production devices may be used for producing the stabilized foam of the present invention, and the invention is not limited to any specific such device. Such devices are well known in the art and familiar to the skilled artisan. Whatever mechanism used, it must be adequate to produce a stream of bubbles suitable for introduction into an appropriate concrete mixture.

The following examples demonstrate the use of the present invention to prepare novel and unique foam aggregates as critical components for high performance cellular concrete materials having densities that vary from 20–140 lb/ft$^3$. The density of any given cured concrete material is, of course, determined by the volume of the novel foam aggregate that is incorporated as well as the choice and proportions of other components such as cement, sand, other aggregate, water, and any other additives or admixtures introduced to the mix. The representative examples that follow produce approximately 4 ft$^3$ of a cured cellular concrete material in a 7 ft$^3$ paddle-type mortar mixer; however, any standard concrete mixer such as a tilting or non-tilting rotary-drum mixer, or open-top revolving blade mixer operating at conventional speeds can be substituted.

| Concentrate I | | |
|---|---|---|
| COMPONENT | CAS NUMBER/TRADE NAME | w/w % |
| Sodium alkenyl sulfonates (mixture) | 68439-57-6, 11066-21-0, 11067-19-9 | 7.0 |
| 1-t-Butoxy-2-propanol | 57018-52-7 | 5.0 |
| Rhamsan gum | 96949-21-2 | 2.0 |
| Perfluoroethylthia acrylic telomer | Lodyne ™ K90'90 (Ciba-Geigy Corp.) | 1.4 |
| n-Alkanols (mixture) | 112-53-8, 112-72-1, 36653-82-4 | 1.0 |
| 2-Methyl-2-propanol | 75-65-0 | 0.2 |
| Water | 7732-18-5 | balance |

EXAMPLE 1

A 7.0 ft$^3$ paddle-type mortar mixer is charged with 35.0 lb of water, 227.5 lb of washed sand, 110 lb of Type I/II Portland cement (Texas Industries, Inc.), and 2.5 oz of Daracem™ ML 330 (a water reducer-superplasticizer available from W. R. Grace). Subsequent mixing at 32 r.p.m. for 5–10 minutes produces a uniform cementitious slurry.

A stable and resilient aqueous foam aggregate is produced separately by diluting Concentrate I to 2.5 w/w % water (39 parts water to one part Concentrate I, respectively) and then aerating it through a foam generating chamber where the mixture is subjected to shearing forces to produce the stabilized foam aggregate. While continuing to mix the cementitious slurry, 1.0 ft$^3$ of the foam aggregate is added to the slurry over approximately one minute. The resultant cellular concrete slurry should be mixed 5 minutes to uniformly disperse the foam aggregate, but can be mixed in excess of 90 minutes without any loss of foam aggregate volume. The cellular concrete slurry is very flowable and readily pours into and completely fills standard cylindrical molds such as those used for ASTM method C-39.

Cylindrical concrete samples (3"×6" and 6"×12") were made from a cellular concrete slurry prepared as above and then cured and tested as specified in ASTM method C-39. The cylinders demonstrated compressive strengths of 2100–2210 psi after 7 days and 2840–3080 psi after 28 days. All of the samples had a density of 107 lb/ft$^3$.

EXAMPLE 2

Using a method similar to Example 1,85.5 lb of Type I/II Portland cement, 28.5 lb of ASTM C 618 Class C fly ash, 34.6 lb of water, 207.0 lb of washed sand, 3.4 oz of Daracem™ ML 330, and 9.0 oz of PolarSet™ (an accelerating admixture available from W. R. Grace) are mixed at 32 r.p.m. for 5–10 minutes to yield a uniform cementitious slurry.

As in Example 1, a stable and resilient aqueous foam aggregate is produced separately by diluting Concentrate I to 2.5 w/w % with water (39 parts water to one part Concentrate I, respectively) and then aerating it. While continuing to mix the cementitious slurry, 1.6 ft$^3$ of the foam aggregate is added to the slurry over approximately one minute. The resultant cellular concrete slurry should be mixed 5 minutes to uniformly disperse the foam aggregate, but can be mixed in excess of 90 minutes without any loss of foam aggregate volume. The cellular concrete slurry is very flowable and readily pours into and completely fills standard cylindrical molds such as those used for ASTM method C-39.

Cylindrical concrete samples (3"×6" and 6"×12") were made from a cellular concrete slurry prepared as above and then cured and tested as specified in ASTM method C-39. The cylinders demonstrated compressive strengths of 1140 psi after 7 days and 1510 psi after 28 days. All of the samples had a density of 92 lb/ft$^3$.

As the invention has been described, it will be apparent to those skilled in the art that the same may be varied in many ways without departing from the spirit and scope thereof. Any and all such modifications are intended to be included within the scope of the appended claims.

What is claimed is:

1. A concrete mix comprising from about 1 to about 50 percent by volume of cement, from about 0 to about 75 percent by volume of washed sand, from about 0 to about 60 percent by volume of coarse aggregate, from about 4 to about 50 percent by volume water, from about 0 to about 50 percent by volume of a member selected from the group consisting of cementitious and pozzolanic materials, from about 0 to about 20 oz of water reducer per 100 pounds of cementitious and pozzolanic material, from about 0 to about 20 oz of accelerator per 100 pounds of cementitious and pozzolanic material, and from about 1 to about 90 percent by volume of air as bubbles comprising from about 0.01 to about 1.0 percent by weight of a foam stabilizing fluorinated surfactant of the formula

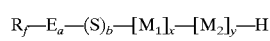

wherein R$_f$ is a perfluorinated alkyl selected from the group consisting of straight chain, branched chain, and cyclic perfluoroalkylenes of 1 to about 20 carbon atoms, perfluoroalkyls substituted with perfluoroalkoxy of 2 to about 20 carbon atoms, perfluoroalkyl oligomers and polymers of greater than 10 carbon atoms, and mixtures thereof, E is selected from the group consisting of direct bonds, alkylenes containing from 2 to about 20 carbon atoms and selected from the group consisting of branched chain, straight chain, and cyclic alkylenes, alkylenes interrupted by one or more members selected from the group consisting of, —NR—, —O—, —S—, —SO$_2$—, —COO—, —OOC—, —CONR—, —NRCO—, —SO$_2$NR—, —NRSO$_2$—, —SiR$_2$—, alkylenes terminated with a member selected from the group consisting of —CONR— and —SO$_2$NR— in which case R$_f$ is attached to the carbon or sulfur atom, and wherein R is selected from the group consisting of hydrogen, alkyl of from 1 to about 10 carbon atoms and hydroxyalkyl having 2 to about 10 carbon atoms, a and b are independently 0 or 1, M$_1$ is a nonionic hydrophilic monomer or mixture of nonionic hydrophilic monomers, and M$_2$ is an anionic hydrophilic monomer or mixture of anionic hydrophilic monomers, wherein x and y are both greater than zero, the sum of x+y is between about 5 and 200, and y/x+y is between about 0.01 and 0.98.

2. The concrete mix of claim 1 wherein M$_1$ is selected from the group consisting of acrylamide, methacrylamide, diacetone acrylamide, 2-hydroxyethyl methacrylate, derivatives of acrylic, methacrylic, maleic, fumaric and itaconic acids, amides, and vinyl esters containing from 1 to about 20 carbon atoms in the ester group.

3. The concrete mix of claim 1 wherein M$_2$ is selected from the group consisting of acrylic and methacrylic acids and salts thereof, maleic, fumaric and itaconic acids and salts thereof, acrylamidopropane sulfonic acid and salts thereof, and mono-olefinic sulfonic and phosphonic acids and salts thereof.

4. The concrete mix of claim 3 wherein M$_1$ is selected from the group consisting of acrylamide, methacrylamide, diacetone acrylamide, 2-hydroxyethyl methacrylate, derivatives of acrylic, methacrylic, maleic, fumaric and itaconic acids, amides, and vinyl esters containing from 1 to about 20 carbon atoms in the ester group.

5. The concrete mix of claim 1 wherein said foam stabilizing fluorinated surfactant is provided in said mix as a surfactant concentrate comprising an aqueous solution of a fatty acid alcohol or mixtures of fatty acid alcohols, a polysaccharide gum, a non-fluorinated anionic surfactant or mixtures of non-fluorinated anionic surfactants, and said foam stabilizing fluorinated surfactant.

6. The concrete mix of claim 5 wherein said surfactant concentrate further includes a solvent.

7. The concrete mix of claim 6 wherein said solvent is propylene glycol t-butyl ether.

8. The concrete mix of claim 5 wherein said fatty acid alcohol is selected from the group consisting of straight and branched chain fatty acid alcohols of about 8 to about 16 carbon atoms, said polysaccharide gum is selected from the group consisting of Rhamsan gums, Xanthan gums, Guar gums, and Locust Bean gums, and said non-fluorinated anionic surfactant is selected from the group consisting of non-fluorinated anionic surfactants comprising from about 8 to about 18 carbon atoms.

9. A method for producing a stabilized foam concrete mix comprising: adding to a concrete mix comprising from about 1 to about 50 percent by volume of cement, from about 0 to about 75 percent by volume of washed sand, from about 0 to about 60 percent by volume of coarse aggregate, from about 4 to about 50 percent by volume water, from about 0 to about 50 percent by volume of a member selected from the group consisting of cementitious and pozzolanic materials, from about 0 to about 20 oz of water reducer per 100 pounds of cementitious and pozzolanic material, and from about 0 to about 20 oz of accelerator per 100 pounds of cementitious and pozzolanic material, a foam aggregate comprising from about 1 to about 90 percent by volume of air as bubbles and comprising from about 0.01 to about 1.0 percent by weight of a foam stabilizing fluorinated surfactant of the formula

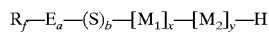

wherein R is a perfluorinated alkyl selected from the group consisting of straight chain, branched chain, and cyclic perfluoroalkylenes of 1 to about 20 carbon atoms, perfluoroalkyls substituted with perfluoroalkoxy of 2 to about 20 carbon atoms, perfluoroalkyl oligomers and polymers of greater than 10 carbon atoms, and mixtures thereof, E is selected from the group consisting of direct bonds, alkylenes containing from 2 to about 20 carbon atoms and selected from the group consisting of branched chain, straight chain, and cyclic alkylenes, alkylenes interrupted by one or more members selected from the group consisting of, —NR—, —O—, —S—, —SO$_2$—, —COO—, —OOC—, —CONR—, —NRCO—, —SO$_2$NR—, —NRSO$_2$—, —SiR$_2$—, alkylenes terminated with a member selected from the group consisting of —CONR— and —SO$_2$NR— in which case R$_f$ is attached to the carbon or sulfur atom, and wherein R is selected from the group consisting of hydrogen, alkyl of from 1 to about 10 carbon atoms and hydroxyalkyl having 2 to about 10 carbon atoms, a and b are independently 0 or 1, M$_1$ is a nonionic hydrophilic monomer or mixture of nonionic hydrophilic monomers, and M$_2$ is an anionic hydrophilic monomer or mixture of anionic hydrophilic monomers, wherein x and y are both greater than zero, the sum of x+y is between about 5 and 200, and y/x+y is between about 0.01 and 0.98.

10. The method of claim 9 wherein M$_1$ is selected from the group consisting of acrylamide, methacrylamide, diacetone acrylamide, 2-hydroxyethyl methacrylate, derivatives of acrylic, methacrylic, maleic, fumaric and itaconic acids, amides, and vinyl esters containing from 1 to about 20 carbon atoms in the ester group.

11. The method of claim 9 wherein M$_2$ is selected from the group consisting of acrylic and methacrylic acids and salts thereof, maleic, fumaric and itaconic acids and salts thereof, acrylamidopropane sulfonic acid and salts thereof, and mono-olefinic sulfonic and phosphonic acids and salts thereof.

12. The method of claim 11 wherein M$_1$ is selected from the group consisting of acrylamide, methacrylamide, diacetone acrylamide, 2-hydroxyethyl methacrylate, derivatives of acrylic, methacrylic, maleic, fumaric and itaconic acids, amides, and vinyl esters containing from 1 to about 20 carbon atoms in the ester group.

13. The method of claim 9 wherein said foam stabilizing fluorinated surfactant is provided in said mix as a surfactant concentrate comprising an aqueous solution of a fatty acid alcohol or mixtures of fatty acid alcohols, a polysaccharide gum, a non-fluorinated anionic surfactant or mixtures of non-fluorinated anionic surfactants, and said foam stabilizing fluorinated surfactant.

14. The method of claim 13 wherein said surfactant concentrate further includes a solvent.

15. The method of claim 14 wherein said solvent is propylene glycol t-butyl ether.

16. The method of claim 13 wherein said fatty acid alcohol is selected from the group consisting of straight and branched chain fatty acid alcohols of about 8 to about 16 carbon atoms, said polysaccharide gum is selected from the group consisting of Rhamsan gums, Xanthan gums, Guar gums, and Locust Bean gums, and said non-fluorinated anionic surfactant is selected from the group consisting of non-fluorinated anionic surfactants comprising from about 8 to about 18 carbon atoms.

17. A concrete mix for the formation of a foamed concrete product comprising cement, water in an amount adequate to hydrate said cement, coarse aggregate, and a stabilized foam aggregate comprising from about 1 to about 90 percent by volume of air as bubbles comprising from about 0.01 to about 1.0 percent by weight of a foam stabilizing fluorinated surfactant of the formula

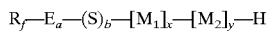

wherein $R_f$ is a perfluorinated alkyl selected from the group consisting of straight chain, branched chain, and cyclic perfluoroalkylenes of 1 to about 20 carbon atoms, perfluoroalkyls substituted with perfluoroalkoxy of 2 to about 20 carbon atoms, perfluoroalkyl oligomers and polymers of greater than 10 carbon atoms, and mixtures thereof, E is selected from the group consisting of direct bonds, alkylenes containing from 2 to about 20 carbon atoms and selected from the group consisting of branched chain, straight chain, and cyclic alkylenes, alkylenes interrupted by one or more members selected from the group consisting of, —NR—, —O—, —S—, —SO$_2$—, —COO—, —OOC—, —CONR—, —NRCO—, —SO$_2$NR—, —NRSO$_2$—, —SiR$_2$—, alkylenes terminated with a member selected from the group consisting of —CONR— and —SO$_2$NR— in which case $R_f$ is attached to the carbon or sulfur atom, and wherein R is selected from the group consisting of hydrogen, alkyl of from 1 to about 10 carbon atoms and hydroxyalkyl having 2 to about 10 carbon atoms, a and b are independently 0 or 1, $M_1$ is a nonionic hydrophilic monomer or mixture of nonionic hydrophilic monomers, and $M_2$ is an anionic hydrophilic monomer or mixture of anionic hydrophilic monomers, wherein x and y are both greater than zero, the sum of x+y is between about 5 and 200, and y/x+y is between about 0.01 and 0.98.

18. The concrete mix of claim 17 wherein $M_1$ is selected from the group consisting of acrylamide, methacrylamide, diacetone acrylamide, 2-hydroxyethyl methacrylate, derivatives of acrylic, methacrylic, maleic, fumaric and itaconic acids, amides, and vinyl esters containing from 1 to about 20 carbon atoms in the ester group.

19. The concrete mix of claim 17 wherein $M_2$ is selected from the group consisting of acrylic and methacrylic acids and salts thereof, maleic, fumaric and itaconic acids and salts thereof, acrylamidopropane sulfonic acid and salts thereof, and mono-olefinic sulfonic and phosphonic acids and salts thereof.

20. The concrete mix of claim 19 wherein $M_1$ is selected from the group consisting of acrylamide, methacrylamide, diacetone acrylamide, 2-hydroxyethyl methacrylate, derivatives of acrylic, methacrylic, maleic, fumaric and itaconic acids, amides, and vinyl esters containing from 1 to about 20 carbon atoms in the ester group.

21. The concrete mix of claim 17 wherein said foam stabilizing fluorinated surfactant is provided in said mix as a surfactant concentrate comprising an aqueous solution of a fatty acid alcohol or mixtures of fatty acid alcohols, a polysaccharide gum, a non-fluorinated anionic surfactant or mixtures of non-fluorinated anionic surfactants, and said foam stabilizing fluorinated surfactant.

22. The concrete mix of claim 21 wherein said surfactant concentrate further includes a solvent.

23. The concrete mix of claim 22 wherein said solvent is propylene glycol t-butyl ether.

24. The concrete mix of claim 21 wherein said fatty acid alcohol is selected from the group consisting of straight and branched chain fatty acid alcohols of about 8 to about 16 carbon atoms, said polysaccharide gum is selected from the group consisting of Rhamsan gums, Xanthan gums, Guar gums, and Locust Bean gums, and said non-fluorinated anionic surfactant is selected from the group consisting of non-fluorinated anionic surfactants comprising from about 8 to about 18 carbon atoms.

* * * * *